United States Patent
Glaubitt et al.

(10) Patent No.: US 6,177,131 B1
(45) Date of Patent: Jan. 23, 2001

(54) METHOD OF MAKING AN ANTI-REFLECTION COATING

(75) Inventors: Walther Glaubitt, Veithoechheim; Andreas Gombert, Freiburg, both of (DE)

(73) Assignee: Fraunhofer-Gesellschaft zur Förderung der angewandten Forschung e.V., Munich (DE)

( * ) Notice: Under 35 U.S.C. 154(b), the term of this patent shall be extended for 0 days.

(21) Appl. No.: 08/953,841

(22) Filed: Oct. 14, 1997

(30) Foreign Application Priority Data

Oct. 14, 1996 (DE) .............................. 196 42 419

(51) Int. Cl.[7] ................. B05D 3/02; B05D 5/06
(52) U.S. Cl. ............ 427/162; 427/167; 427/226; 427/387
(58) Field of Search ................... 427/387, 162, 427/167, 226

(56) References Cited

U.S. PATENT DOCUMENTS

| 4,830,879 | 5/1989 | Debsikdar ........................... 427/162 |
| 5,976,680 | * 1/1945 | Ikemori et al. ........................ 428/212 |

FOREIGN PATENT DOCUMENTS

| 4430859 | 3/1995 | (DE) . |
| 0514973 | 11/1992 | (EP) . |

* cited by examiner

Primary Examiner—Erma Cameron
(74) Attorney, Agent, or Firm—Karl Hormann

(57) ABSTRACT

A method of and a solution for making a highly porous optical antireflection coating of a selectively designed index of refraction, by applying a colloidal dispersion derived from hydrolytically condensing, in the presence of water and a catalyst, one or more silicon compounds of the general formula $R_aSiX_{4-a}$, or precondensates derived therefrom, to a substrate. In the formula, R is an organic group having from 1 to 10 carbon atoms which may be interrupted by oxygen atoms and/or sulfur atoms and/or amino groups, X is hydrogen, halogen, hydroxy, alkoxy, acyloxy, alkylcarbonyl, alkoxycarbonyl or $NR'_2$, R' being hydrogen, alkyl or aryl and a being 0, 1 or 2. The solution also contains colloidally dispersed organic polymers at a molar ratio, relative to the silane, between 0.1 mmol/mol silane and 100 mmol/mol silane, the median molecular mass of the polymer being between 200 and 500,000. Sol-vents, preferably alcohol, may also be present in the solution. After being applied to an optical substrate, the solution is dried and organic components are removed from it to leave a porous coating of predetermined index of refraction.

8 Claims, 1 Drawing Sheet

METHOD OF MAKING AN ANTI-REFLECTION COATING

BACKGROUND OF THE INVENTION

1. Field of the Invention

The present invention, in general, relates to a composition for, and a method of, making a highly porous anti-flection coating, and, more particularly, to an optical anti-reflection coating for simultaneously improving the transmission and preventing or minimizing undesired reflections of visible and other electromagnetic radiation of the kind occurring, for instance, at cathode ray tubes, liquid crystal displays, instrument panels, spectacle lenses, picture tubes, solar collectors and automotive windscreens.

2. The State of the Art

When light is penetrating the interface between two media of different diffractive indices a portion of the radiation is reflected. The reflected portion of light vertically impinging upon a pane of glass having an index of refraction n=1.5 is about 4%. If, however, the light falls on the interface at an acute angle, a much greater portion is reflected.

Display devices such as, for example, cathode ray tubes or liquid crystal displays are used for many different applications. While the quality of their images has been improved, the images are often difficult to distinguish because of reflections. Furthermore, the reliability of the information transmitted, for instance, from instrument panels, watch crystals or automotive windscreens is often reduced significantly because of reflections.

Reduced reflections are desirable for a great many optical systems. Anti-reflection coatings on spectacle lenses are a well-known example. By using covers with anti-reflection coatings on solar devices their efficiency could be enhanced.

Reflection may also be reduced by the application of interference coatings. If a coating of a thickness $\lambda/4$ is applied to glass (n=1.5), for instance, destructive interference will result between the reflected portion at the interfaces between air and coating as well as coating and glass. Yet the conditions for destructive interference always hold only for a particular wave length and a particular angle of incidence. The refractive index of the coating determines the level of minimum reflection. For glass of optimum anti-reflection properties it has to be 1.22 in order to result in close to zero at a wavelength of $\lambda$. Such a low index of refraction cannot, however, be achieved with dense coatings. A single anti-reflection coating of the kind mentioned is extremely effective for visual as well as for solar purposes. The antireflective effect of the often used treble layered interference coatings reasonably extends over the range of visible light, i.e. from about 400 nm to about 800 nm. Such coatings are, however, unsuited for solar applications because the spectrum of solar radiation covers a much wider range.

Reduced reflection may also be achieved by a surface with a graduated refractive index. That is to say, rather than changing abruptly the refractive index approaches the value for glass from the value for air (n=1) in several steps. The advantage of such a layer is that it effectively reduces reflection over a broad-band spectral range and for all angles of incidence.

Different processes for fabricating anti-reflective surfaces exist already. For example, transparent anti-reflection films or coatings of different refractive indices have been applied to surfaces to reduce undesirable surface reflections. Such processes do, however, entail problems as they involve the application of at least two coatings. This results in lower productivity and higher production costs. To render spectacle lenses or video screens anti-reflective, for instance, interference layers are applied by vapor deposition. While the layers thus produced are relatively abrasion resistant, their high costs of about $60.00 (DM 100.00) to about $100.00 (DM 150.00) per square meter of treated surface area constitute a disadvantage. On the other hand, sputtered multi-layered interference coatings are suitable only for visual anti-reflection coatings and cannot be applied to every kind of substrate geometry, such as the internal surfaces of tubes, for instance. Diffuse anti-reflection by roughening the surface is most common but does not result in enhanced transmission. Anti-reflection of high optical value may be obtained by a treble-layered system involving a sol-gel process. Such a process is suitable even for making large display windows anti-reflective. But at a cost of about $100.00 (DM 140.00) to about $150.00 (DM 200.00) it is a relatively expensive process.

German patent application 4,430,859 discloses an anti-reflection coating consisting of two layers of different indices of refraction. At least its first layer also contains a light absorber. While the processes for producing these layers are conventional, involving sputtering, vapor deposition or other common coating processes, they are, nevertheless, expensive. Moreover, another disadvantage of such an anti-reflection coating and of its manufacturing process resides in the fact that because of the light absorber it is very unlikely that the transmission is significantly increased.

European patent specification 0,514,973 discloses an anti-reflection coating for cathode ray tubes, in particular. The coating has a graduated index of refraction decreasing from the surface of the substrate in the direction of the coating surface. The coating is produced by a sol-gel process in which the conditions of the reaction during the gel formation are varied such that the resultant gel is non-porous with the degree of cross-linkage increasing from the surface of the substrate toward the outer surface of the coating. The disadvantage of this process is the dispersion occurring as a result of relatively large particles in the coating. The dispersion results in reduced transmission thus rendering it unsuited for solar applications. Also, the multiple coating application is very expensive.

U.S. Pat. No. 4,830,879 also teaches an anti-reflective coating for surfaces of glass, metal and crystal. The coating is produced by multiple coating and by a sol-gel process by hydrolytic condensation of metal alkoxides. To this end, four differently aged solutions each containing particles of a size different from those of the other solutions are produced for consecutive coatings of a substrate. The resultant antireflection coating has a gradient of particle sizes and, hence, of porosity and refractive index. While such multi-layer coatings or gradient layers lead to broad-band antireflection, they do, however, depend upon extremely porous structures (n=1.05!) in the direction of the surface of the coating. These structures tend to be very unstable mechanically. The disadvantage of this kind of coating, moreover, resides in its complex manufacturing process which, because of the numerous process steps, is very expensive.

OBJECTS OF THE INVENTION

It is a primary object of the invention to provide a method of producing by a single coating a refractive index with ideal antireflection properties Another object resides in the provision of such a method useful for coating surfaces of many different substrates such as, for instance, glasses, metals, or polymeric materials to reduce or even eliminate reflections. 4, Another object of the invention is to provide a method of the kind referred to of structuring a surface in such a way that aside from reducing or eliminating reflections an increase in transmission is also achieved.

A still further object of the invention is a qualitatively uniform and inexpensive elimination or reduction of reflections on large area substrates.

It is yet another object of the invention to provide for a process of applying an antireflection coating in a single operational step.

A further object of the invention is to provide an antireflection coating of negligible thickness variations on large surface substrates in a single operational step.

It is also an object of the invention universally to structure an antireflective coating application method such that different substrate materials may be provided with an antireflection system.

Still another object of the invention resides in a method of making an antireflection coating for reducing or eliminating reflections of electromagnetic radiation of different wavelengths.

DETAILED DESCRIPTION OF THE INVENTION.

In accordance with a currently preferred embodiment of the invention, a colloidal dispersion is applied to the surface to be provided with an antireflection coating and is dried. Thereafter, organic components are removed by heating. The colloidal dispersion or solution is preferably derived by hydrolytic condensation of silicon compounds having the general formula I:

$$R_a SiX_{4-a} \quad (1)$$

in which the groups are alike or different and R is an organic group with 1 to 10 carbon atoms which may be interrupted by oxygen and/or sulfur atoms and/or amino groups, and X is hydrogen, halogen, hydroxy, alkoxy, acyloxy, alkylcarbonyl, alkoxycarbonyl or $NR'_2$, R' being hydrogen, alkyl or aryl and a being 0, 1 or 2. Monomeric silicon compounds of formula I or precondensates derived therefrom may be used to produce the colloidal dispersion. The hydrolytic condensation is carried out with water or moisture and, if necessary, in the presence of a catalyst and/or solvent.

The colloidal dispersion or solution additionally contains one or more organic polymers carrying one or more OH and/or NH groups. The median molecular mass of these polymers is between 200 and 500,000, and the molar ratio between polymer and silane is between 0.1 mmol/mol silane and 100 mmol/mol silane.

The alkyl groups in general formula I are long-chain, cross-linked or cyclic groups having 1 to 10 carbon atoms and preferably lower alkyl groups having 1 to 6 and more particularly 1 to 4 carbon atoms. Particular examples are methyl, ethyl, n-propyl, 1-propyl, n-butyl, 1-butyl, s-butyl, t-butyl, n-pentyl, n-hexyl, cyclohexyl, 2-ethylhexyl, dodecyl and octadecyl.

Preferred aryl groups of general formula I are, for instance, phenyl, biphenyl and naphthyl. The alkoxy, acyloxy, alkylcarbonyl, alkoxycarbonyl, alkylamino and dialkylamino groups are preferably derived from alkyl and aryl groups mentioned supra. Particular examples are methoxy, ethoxy, n- and 1-propoxy, n-, 1-, s- and t-butoxy, monomethylamino, monoethylamino, dimethylamino, diethylamino, N-ethylanilino, acetyloxy, propionyloxy, methylcarbonyl, ethylcarbonyl, methoxycarbonyl, ethoxycarbonyl, benzyl, 2-phenylethyl and tolyl.

The mentioned groups may, optionally carry one or more substituents such as, for example, halogen, alkyl, hydroxyalkyl, alkoxy, aryl, aryloxy, alkylcarbonyl, alkoxycarbonyl, furfuryl, tetrahydrofurfuryl, amino, monoalkylamino, dialkylamino, trialkylammonium, amido, hydroxy, formyl, carboxy, mercapto, cyano, isocyanato, nitro, epoxy, $SO_3H$ or $PO_4H_2$.

Fluorine, bromine and, more particularly, chlorine are the preferred halogens.

The silanes of general formula I are hydrolyzable and condensible through the X groups. An inorganic network containing Si—O—Si units is built up by these hydrolyzable and condensible groups. Without limitation, examples of such silanes in general are $Cl_3SiCH_3$, $Si(CH_3)(OC_2H_5)_3$, $Si(C_2H_5)Cl_3$, $Si(C_2H_5)(OC_2H_5)_3$, $Si(CH=CH_2)(OC_2H_5)_3$, $Si(CH=CH_2)(OC_2H_4OCH_3)_3$, $Si(CH=CH_2)(OOCCH_3)_3$, $Cl_2Si(CH_3)_2$, $Si(CH_3)_2(OC_2H_5)_2$, $Si(C_2H_5)_2(OC_2H_5)_2$, $Cl_2Si(CH=CH_2)(CH_3)$, $Si(CH_3)_2(OCH_3)_2$, $Cl_2Si(C_6H_5)_2$, $Si(C_6H_5)_2(OC_2H_5)_2$, $Cl_3Si(CH=CH_2)$, $Si(OC_2H_5)_3(CH_2—CH=CH_2)$, $Si(OOCCH_3)_3 (CH_2—CH=CH_2)$ and $(HO)_2Si (C_6H_5)_2$.

In a preferred embodiment of the method in accordance with the invention, silicon compounds of general formula $SiX_4$ are used. Without limitation, concrete examples of such silanes are $SiCl_4$, $HSiCl_3$, $Si(OCH_3)_4$, $Si(OOCH_3)_4$ and $Si(OC_2H_5)_4$, tetraalkoxysilane being preferred and $Si(OCH_3)_4$ (TMOS) being especially preferred.

The silanes of general formula I may either be purchased commercially, or they may be produced in the manner described in "Chemie und Technologie der Silicone" by W. Noll, Verlag Chemie, Weinheim/Bergstrasse, Germany, 1968). They may be used as such or as precondensates.

For erecting the inorganic network, silicones of general formula I are hydrolyzed and polycondensed. Preferably, the polycondensation is carried out by a sol-gel-method of the kind described, for instance, in German patent specifications 2,758,414, 2,758,415, 3,011,761, 3,826,715 and 3,835,968. The polycondensation may be carried out, for instance, by directly adding the required water, either at room temperature of slightly cooled, (preferably by stirring and in the presence of a hydrolysis or condensation catalyst) to the silicon compounds to be hydrolyzed, the silicon compounds being used either as such or dissolved in a suitable solvent. The resultant mixture is thereafter stirred for some time (one to several hours).

As a rule, the hydrolysis is carried out at temperatures between −20 and 130° C., preferably between 0 and 30° C. or at the boiling point of any solvent which may be present. The best mode of adding water depends primarily upon the reactivity of the starting compounds used. Thus, the dissolved starting compounds may be slowly dripped to an excess of water, or the water is added in one lot, or it is added in portions to the possibly dissolved starting compounds. It may also be useful not to add the water as such but to add it to the reaction system by means of aqueous organic or inorganic systems. However, the water may also be added by way of a chemical reaction during the course of which water is released. Esterifications are examples thereof.

Aside from low aliphatic alcohols (e.g. ethanol or 1-propanol), solvents which may also be used are ketones, preferably low dialkylketones such as acetone or methylisobutylketone, ether, preferably low dialkylether such as diethylether or dibutylether, THF, amide, ester, more particularly acetic acid ethyl ester, dimethylformamide, amines, especially triethylamine, and mixtures thereof. In preferred embodiments of the method in accordance with the invention alcohols are used as solvents. Preferred alcohols are ethanol, 1-propanol, n-propanol, 1-methoxy-2-propanol or methoxyethanol and, especially preferred, methanol. The quantity of the solvent used depends upon the quantity and solubility of the (partially)condensed silicon compounds and the polymers used. It is critical that the coating solution of the invention is a colloidal dispersion. Moreover, an alcohol solvent may function as a moderator for the hydrolysis and the condensation. In that manner the reactivity of the system may be controlled and adjusted to the requirements of any given application.

It is not necessary that all of the starting compounds be present at the commencement of the hydrolysis (polycondensation). Rather, in certain circumstances it may be advantageous, initially to contact only some of these compounds with water and to add the remaining compounds later on.

Water may be added in one batch or in several steps, for instance, in three steps. For example, one tenth to one twentieth of the quantity of water required for the hydrolysis may be added during the first step. After stirring for a short period, one fifth to one tenth of the required quantity of water may be added, and after brief stirring the remainder may be added.

The condensation time is dependent upon the starting compounds used as well as on the proportional shares, any catalyst used, the reaction temperature, and so forth. In general, the polycondensation is carried out at normal pressure, but it may also be carried out at increased or at reduced pressure.

Aside from hydrolytically (partially) condensed silicon compounds the coating solution in accordance with the invention contains one or more organic polymers in a colloidally dispersed state. The polymers have OH and/or NH groups, and their median molecular masses lie between 200 and 500,000, the molar ratio of polymer to silane being between 0.1 mmol/mol silane to 100 mmol/mol silane. The polymers added in accordance with the invention contain OH, NH or SH groups which provide for an interaction with the inorganic network erected by the hydrolytic condensation of the silicon compounds. This interaction results in a uniform distribution of the organic polymers in the polycondensate which, in turn, leads to a particularly homogenous porosity of the antireflective coating of the invention.

The organic polymers may be added at the commencement of the hydrolytic condensation, during the condensation or after its termination.

Without be so limited, examples of such polymers are polyhydrazides [CO—R'—CO—NH—NH—CO—R"—CO—NH—NH] or polyethyleneimines [CH$_2$—CH$_2$—NH]$_x$ [CH$_2$—CH$_2$—N]$_y$

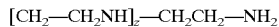

whereby polyethylene glycolalkylethers, polyvinylacetates, polyvinyl pyrrolidones, polyvinyl alcohols, poly-(2-ethyl-2-oxazolines), poly-(hydroxymethacrylates) and poly(hydroxyacrylates) are particularly preferred.

In preferred embodiments of the method in accordance with the invention, the median molecular mass of the organic polymers lies between 500 and 50,000.

In further preferred embodiments, the pH-value of the coating solution in accordance with the invention is $\leq 7$. This may be attained, for instance, by using alkaline condensation catalysts, such as, for example, ammonia or basically reacting polymers, such as, for instance, polyethyleneimines.

It has been found to be particularly advantageous to use a volatile base which may then be driven out by simply increasing the temperature.

The coating solution in accordance with the invention may be applied to, and dried on, the surfaces to which an antireflection coating is to be applied, by conventional methods. It goes without saying that the viscosity of the inventive coating solution and the parameters of the coating operation, e.g. the speed of submersion and withdrawal of the substrate to be coated into and out of the coating solution have to be coordinated as a function of the desired coating thickness. This is, however, well known to any person skilled in the art of such coatings.

It may in many instances be of advantage to age the coating solution in accordance with the invention by stirring it and by storing it. This leads to a growth in the size of the particles and to the formation of oligomeric structures. It is, however, necessary to ensure that at the time of the coating operation the inventive coating solution is in the state of a colloidal dispersion. In that way, particularly uniform and homogeneous antireflection coatings may be obtained.

Thereafter the organic components, i.e. the organic polymers and any of the R groups present in the polycondensate are removed by heating. The temperatures applied for this purpose are, of course, dependent upon the thermal stability of the coated substrates and of the organic components to be removed. The resultant antireflection coating is entirely inorganic and may be subjected to strong thermal influences.

It has surprisingly been found that by the process of the present invention large surface substrates may at low cost be provided with an antireflection coating of negligible variations in thickness. The coating may be provided by a single layer applied to the substrate. It was also found as a matter of surprise that by infusing organic polymers into the coating solution of the invention, particularly uniform antireflection coatings of a particularly uniform porosity and coating thickness are obtained. As a consequence, the antireflection coatings in accordance with the invention have a particularly uniform index of reflection and that substrates provided with the antireflection coating in accordance with the invention have a uniform coloring of their surfaces. In contrast to the state of the art, the antireflection coating in accordance with the invention has no graduated index of refraction.

Not only do the antireflection coatings in accordance with the invention reduce or eliminate reflections, but at the same time they improve the transmission.

The antireflection coatings in accordance with the invention are pure inorganic systems offering all the advantages inherent therein, such as, for instance, stability agains mechanical and thermal stress as well as against aging. Accordingly, antireflection coatings in accordance with the invention may be subjected to higher operating temperatures of the kind occurring in solar power plants.

In contrast to prior art systems, antireflection coatings in accordance with the invention may be applied significantly more economically. Conservative estimates would suggest that the price of glass coated on both sides would be below $7.00 (DM 10.00) per square meter.

Not only do antireflection coatings in accordance with the invention adhere to almost all kinds of mineral glass, but also to metals, such as, for instance, steel, and plastics, such as, for instance, PMMA (polymethylmethacrylate), PC (polycarbonate) or PS (polystyrene).

The porosity and, hence, the refractive index of antireflection coatings in accordance with the invention may be selectively controlled by the size and quantity of the organic polymer, and they may thus be adjusted to the requirements of any given application. For instance, an increase in the volume of pores results in a reduction of the refractive index. Furthermore, the antireflective properties of the coating in accordance with the invention may be selectively adjusted to the wavelength of any incident radiation.

The antireflection coating in accordance with the invention may be used, for instance, to impart antireflection and increased transmission to cathode ray tubes, instrument panels, spectacle lenses, video screens, solar collectors for increasing their efficiency, windows, tubes and so forth.

An embodiment of the method in accordance with the invention will be explained in more detail with reference to the following example:

EXAMPLE

In the presence of 27.0 g of methanol, 7.6 g of polyethylene glycol of a median molecular mass of 10,000 are dissolved in 9.5 g of ammoniacal water having a pH-value of 9,5. The resultant mixture is added to a mixture of 15.2 g of tetramethoxysilane and 80.0 of methanol. After stirring for 10 minutes, the resultant mixture is filtered. After it had aged for about 80 minutes, glass panes were coated by submersion in the mixture. To obtain a particularly uniform coating of about 100 nm the pane to be coated is fixed in the coating bath and the coating solution therein is removed free of vibration within 2 minutes. Following their coating, the panes are dried at 130° C. for 30 minutes. Thereafter, their temperature is raised to 500° C. at a rate of 120 K/h, and the panes are maintained at this temperature for one hour. The result is glass panes with an antireflection coating of a mauve-bluish hue. The resultant antireflection coating was found to have an index of refraction of 1.22.

Figure 1:
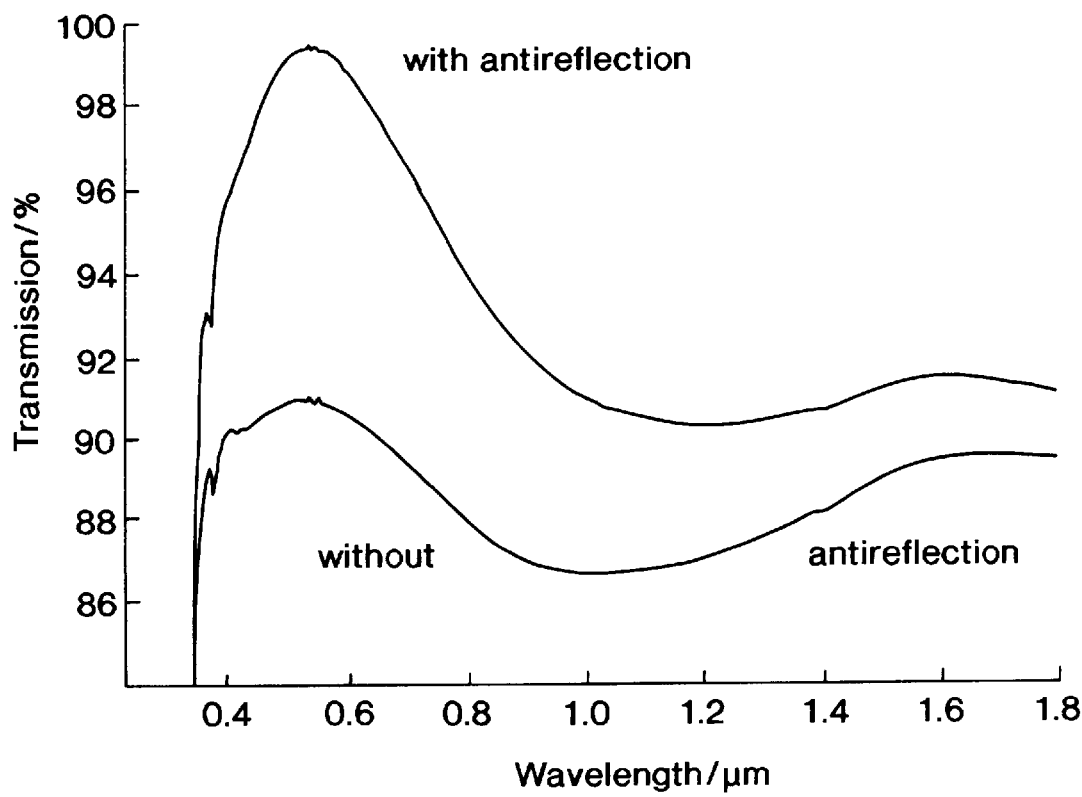
FIG. 1 depicts the transmission of a glass pane having an antireflection coating in accordance with the described embodiment in comparison with a sample without coating.
Figure 2:
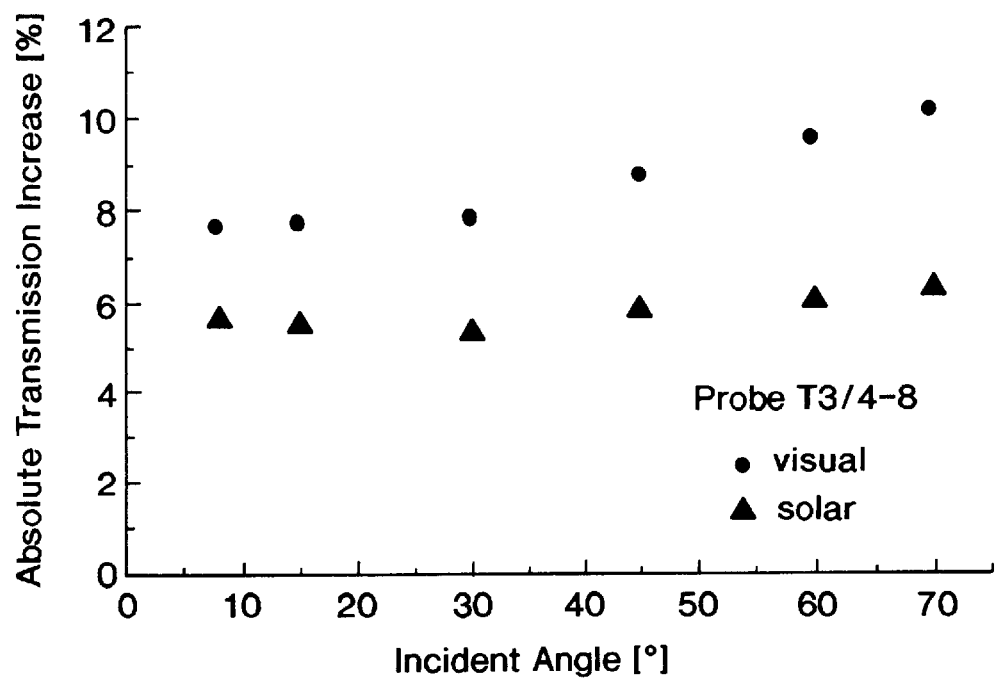
FIG. 2 depicts the increase of visual and solar transmission of a glass pane with an antireflection coating in accordance with the described embodiment.

What is claimed is:
1. A method of making a porous antireflection coating, comprising the steps of:
preparing a colloidal disperse solution of a pH value $\geq 7$ and including organic components by hydrolytically condensing at least one of at least one of a silicon compound of general formula I:

$$R_a SiX_{4-a} \qquad (1)$$

wherein the groups are alike or different and wherein R is an organic group having 1 to 10 carbon atoms and X is hydrogen, halogen, hydroxy, alkoxy, acyloxy, alkylcarbonyl, alkoxycarbonyl or $NR'_2$, R' being hydrogen, alkyl or aryl and a being 0, 1 or 2, and a precondensate derived therefrom, and containing at least one colloidally dispersed organic polymer of a median molecular mass between 200 and 500,000, said polymer having at least one of OH and NH groups, the molar ratio between polymer and silicon compound being between 0.1 mmol/mol silane and 100 mmol/mol silane;

applying said solution to a substrate;
drying said solution; and
removing said organic components by heating.

2. The method of claim 1, wherein said organic group R is interrupted by at least one of oxygen atoms, sulfur atoms and amino groups.

3. The method of claim 2, wherein said silicon compound is of the general formula $SiX_4$, group X being as defined in claim 1.

4. The method of claim 1, further including the step of adding a solvent for preparing said colloidal disperse solution.

5. The method of claim 4, wherein said solvent is an alcohol selected from the group consisting of methanol, ethanol, l-propanol, n-propanol, 1-methoxy-2-propanol and 2-methoxyethanol.

6. The method of claim 1, further including the step of adding a catalyst for preparing said colloidal disperse solution.

7. The method of claim 1, wherein the median mass of said organic polymer is between 500 and 50,000.

8. The method of claim 7, wherein said organic polymer is selected from the group consisting of polyethyleneglycolalkylether, polyvinylacetate, polyvinylpyrrolidone, polyvinylalcohol, poly-(2-ethyl-2-oxazoline), poly-(hydroxymethylacrylate) and poly-(hydroxyacrylate).

* * * * *